United States Patent
Xiang

(10) Patent No.: US 11,422,607 B2
(45) Date of Patent: Aug. 23, 2022

(54) TERMINAL AND METHOD FOR MANAGING THE SAME

(71) Applicant: Samsung Electronics Co., Ltd., Gyeonggi-do (KR)

(72) Inventor: Shijie Xiang, Guangdong (CN)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 17/109,706

(22) Filed: Dec. 2, 2020

(65) Prior Publication Data

US 2021/0373641 A1    Dec. 2, 2021

(30) Foreign Application Priority Data

May 29, 2020  (CN) .................. 202010475267.1

(51) Int. Cl.
*G06F 1/32* (2019.01)
*G06F 1/3212* (2019.01)
*G06N 20/00* (2019.01)
*G06F 1/3234* (2019.01)

(52) U.S. Cl.
CPC .......... *G06F 1/3212* (2013.01); *G06F 1/3234* (2013.01); *G06N 20/00* (2019.01)

(58) Field of Classification Search
CPC ...................................................... G06F 1/32
See application file for complete search history.

(56) References Cited

U.S. PATENT DOCUMENTS

| | | |
|---|---|---|
| 2010/0131790 A1 | 5/2010 | Zhang et al. |
| 2013/0311803 A1 | 11/2013 | Wang et al. |
| 2014/0082383 A1 | 3/2014 | De Cesare et al. |
| 2015/0156307 A1 | 6/2015 | Kim et al. |
| 2017/0195969 A1 | 7/2017 | Miao et al. |
| 2017/0245217 A1 | 8/2017 | Kim et al. |
| 2018/0364786 A1* | 12/2018 | de la Cropte de Chanterac ......... G06F 1/206 |

(Continued)

FOREIGN PATENT DOCUMENTS

| | | |
|---|---|---|
| CN | 104518206 | 4/2015 |
| CN | 105929927 | 9/2016 |
| CN | 106230038 | 12/2016 |

(Continued)

OTHER PUBLICATIONS

International Search Report dated Feb. 25, 2021 issued in counterpart application No. PCT/KR2020/014767, 7 pages.

(Continued)

*Primary Examiner* — Paul B Yanchus, III
(74) *Attorney, Agent, or Firm* — The Farrell Law Firm, P.C.

(57) ABSTRACT

A terminal and a method for managing the terminal are provided. The method includes: obtaining usage data of a user; determining whether the terminal is in a predetermined charging state; and performing an operation related to an artificial intelligence based on the usage data of the user, in response to the terminal being in the predetermined charging state. According to the terminal and the method for managing a terminal, the timing for performing the operation related to artificial intelligence can be adaptively selected to achieve a technical effect of improving the stability of the intelligent operation and reducing the power consumption of the terminal.

20 Claims, 2 Drawing Sheets

(56) References Cited

U.S. PATENT DOCUMENTS

2019/0086988 A1* 3/2019 He .................. G06N 20/00
2019/0272481 A1* 9/2019 Price .................. G06F 1/206

FOREIGN PATENT DOCUMENTS

| CN | 106951145 | 7/2017 |
| CN | 107171412 | 9/2017 |
| CN | 107809542 | 3/2018 |
| CN | 10817714 | 6/2018 |
| CN | 110837288 | 2/2020 |
| KR | 1020130007258 | 1/2013 |
| KR | 1020150062811 | 6/2015 |
| KR | 1020170097941 | 8/2017 |
| TW | 200906153 | 2/2009 |

OTHER PUBLICATIONS

Chinese Office Action dated Aug. 4, 2021 issued in counterpart application No. 202010475267.1, 8 pages.

\* cited by examiner

TERMINAL AND METHOD FOR MANAGING THE SAME

CROSS-REFERENCE TO RELATED APPLICATION

This application claims priority under 35 U.S.C. § 119 to Chinese Patent Application No. 202010475267.1, filed in the Chinese Intellectual Property Office on May 29, 2020, the entire disclosure of which is incorporated herein by reference.

BACKGROUND

1. Field

The present disclosure generally relates to the field of terminal management, and more specifically, to a terminal and a method for managing the same.

2. Related Art

With the emergence of embedded neural network processor chips, more and more artificial intelligence technology implementation solutions, which is conventionally implemented based on loud artificial intelligence (On Cloud AI), are being implemented based on-device-artificial-intelligence (On Device AI). It is expected that intelligent terminal devices may carry more artificial intelligence operations in the next few years.

However, when an intelligent terminal device performs artificial intelligence operations on a large-scale data volume, power consumption of the intelligent terminal device may increase and the battery power of the intelligent terminal device may drop sharply due to its long running-life and high power consumption. The intelligent terminal device is at a risk of power loss if it is in a low power state at the initial stage of the operations. Thereby, the continuity and stability of the operations cannot be guaranteed. On the other hand, if a larger-capacity battery is installed at the intelligent terminal device for solving the above problem, not only the cost will increase, but also the appearance design of intelligent terminal device may become heavy. The frequent use of mobile power for charging reduces the convenience and greatly reduces the user experience.

SUMMARY

Exemplary embodiments of the present disclosure intend to provide a terminal and a method for managing the terminal, which can overcome the defect of a battery of an intelligent terminal being unable to meet power demands for computing on a large-scale data volume.

According to an aspect of an exemplary embodiment of the present disclosure, there is provided a method for managing a terminal, including: obtaining usage data of the user; determining whether the terminal is in a predetermined charging state; and performing an operation related to an artificial intelligence based on the usage data of the user, in response to determining that the terminal is in the predetermined charging state.

Alternatively, the predetermined charging state may indicate at least one of a charging stage where a current battery power is greater than a preset threshold, a charging state where a predetermined power supply mode is provided, a charging stage where real-time charging power is greater than real-time power consumption, charging within a predetermined time period, and a charging state in which it is predicted, based on a predetermined algorithm, a predetermined charging condition is satisfied.

Alternatively, the method may further include; obtaining a charging parameter of the terminal; and controlling at least one parameter which is used by the terminal to perform the operation related to the artificial intelligence based on the charging parameter of the terminal.

Alternatively, the charging state in which it is predicted that the predetermined charging condition is satisfied according to the predetermined algorithm is determined by: obtaining historical charging data of the terminal; determining a current charging trend according to the predetermined algorithm, based on the historical charging data of the terminal; determining whether the current charging trend satisfies the predetermined charging condition; and determining that the current charging trend satisfies the predetermined charging condition as the charging state is the predetermined charging condition is satisfied. In the charging state which the predetermined charging condition is satisfied, the operation related to the artificial intelligence can be performed without affecting the user's charging demand during charging of the terminal.

Alternatively, the step of the determining whether the trend satisfies the predetermined charging condition may include: determining whether battery power of the terminal is reduced when operation related to the artificial intelligence is performed during the charging of the terminal, determining the current charging trend satisfies the predetermined charging condition, if the battery power of the terminal is not reduced.

Alternatively, the historical charging data may include at least one of a time period for performing the charging, a charging duration, a power supply mode, information on power consumption of the terminal and a power consumption mode of the terminal during the charging of the terminal.

Alternatively, the method may further include determining whether the terminal is in the predetermined charging state, which may further include: determining whether a first value obtained by subtracting power consumption of the terminal and to-be-charged power of the terminal from chargeable power of the terminal within the predetermined time is greater than a second value which is a power consumption required to perform the operation related to the artificial intelligence; and determining the terminal is in the predetermined charging state, if the first value is greater than the second value. The chargeable power of the terminal is power to be charged to the terminal within the predetermined time period. The to-be-charged power of the terminal is a difference between target power and current power of the terminal when the terminal is charged. The power consumption of the terminal is power consumption required when the terminal does not perform the operation related to the artificial intelligence within the predetermined time period.

Alternatively, the operation related to the artificial intelligence related operation may include training a machine learning model. The step of controlling the at least one parameter which is used by the terminal to perform the operation related to the artificial intelligence, based on the charging parameter, may include: controlling, based on the charging parameter of the terminal, a learning rate of the training which is used by the terminal to train the machine learning model. The learning rate of the training may indicate a step size for moving between a target function of the machine learning model and a minimum value of the target function.

Alternatively, charging within a predetermined time period may include charging in a predetermined mode within the predetermined time period.

Alternatively, the power consumption required to perform the operation related to the artificial intelligence is power required to perform the operation related to the artificial intelligence with minimum amount of computation.

Alternatively, the target power is battery power to which the user is used to charging the terminal in a current period.

According to another aspect of an exemplary embodiment of the present disclosure, there is provided a terminal including: a collector; and a processor coupled to the collector, wherein the processor is configured to obtain usage data of a user, determine whether the terminal is in a predetermined charging state, and perform an operation related to an artificial intelligence based on the usage data of the user, in response to determining that the terminal is in the predetermined charging state.

Alternatively, the predetermined charging state may indicate at least one of a charging stage where current battery power is greater than a preset threshold, a charging state where a predetermined power supply mode is provided, a charging stage where real-time charging power is greater than real-time power consumption, charging within a predetermined time period, and a charging state in which it is predicted based on a predetermined algorithm, that a predetermined charging condition is satisfied.

Alternatively, the processor is further configured to: obtain a charging parameter of the terminal; and control at least one parameter which is used by the terminal to perform the operation related to the artificial intelligence, based on the charging parameter of the terminal.

Alternatively, the processor is further configured to: obtain historical charging data of the terminal; determine a current charging trend according to the predetermined algorithm, based on the historical charging data of the terminal; determine whether the current charging trend satisfies the predetermined charging condition; and determine that the current charging trend satisfies the predetermined charging condition as the charging state if the predetermined charging condition is satisfied. In the charging state which the predetermined charging condition is satisfied, the operation related to the artificial intelligence can be performed without affecting the user's charging demand during charging of the terminal.

Alternatively, the processor is further configured to: determine whether battery power of the terminal is reduced when the operation related to the artificial intelligence is performed during the charging of the terminal, and determine the current charging trend satisfies the predetermined charging condition, if the battery power of the terminal is not reduced.

Alternatively, the historical charging data may include at least one of a time period for performing the charging, a charging duration, a power supply mode, information on power consumption of the terminal and a power consumption mode of the terminal during the charging of the terminal.

Alternatively, the processor is further configured to: determine whether the terminal is in the predetermined charging state. The processor is further configured to: determine whether a first value obtained by subtracting power consumption of the terminal and to-be-charged power of the terminal from chargeable power of the terminal within the predetermined time is greater than a second value which is a power consumption required to perform the operation related to the artificial intelligence; and determine the terminal is in the predetermined charging state, if the first value is greater than the second value. The chargeable power of the terminal is power to be charged to the terminal within the predetermined time period. The to-be-charged power of the terminal is a difference between target power and current power of the terminal when the terminal is charged. The power consumption of the terminal is power consumption required when the terminal does not perform the operation related to the artificial intelligence within the predetermined time period.

Alternatively, the operation related to the artificial intelligence related operation may include training a machine learning model. The processor is further configured to control, based on the charging parameter of the terminal, a learning rate of the training which is used by the terminal to train the machine learning model. The learning rate of the training may indicate a step size for moving between a target function of the machine learning model and a minimum value of the target function.

Alternatively, the charging within the predetermined time period may comprise charging in a predetermined mode within the predetermined time period.

Alternatively, the power consumption required to perform the operation related to the artificial intelligence is power required to perform the operation related to the artificial intelligence with minimum amount of computation.

Alternatively, the target power is battery power to which the user is used to charging the terminal in a current period.

According to another aspect of an exemplary embodiment of the present disclosure, a computer readable storage medium storing a computer program is provided, the computer program, when executed by a processor, implements the method for managing the terminal according to the present disclosure.

The terminal and the method for managing the terminal according to the exemplary embodiments of the present disclosure may adaptively select the timing for performing an operation related to the artificial intelligence, thereby improving the stability of the intelligent operation and reducing the power consumption of the terminal.

Additional aspects and/or advantages of the present disclosure will be set forth and become apparent in/from the description which follows, or may be learned by implementation of the embodiments in the description.

BRIEF DESCRIPTION OF THE DRAWINGS

The above and other objects of exemplary embodiments of the present disclosure will become more apparent through the following detailed description in conjunction with the accompanying drawings that exemplarily show the embodiments, in which.

DETAILED DESCRIPTION

Figure 1:
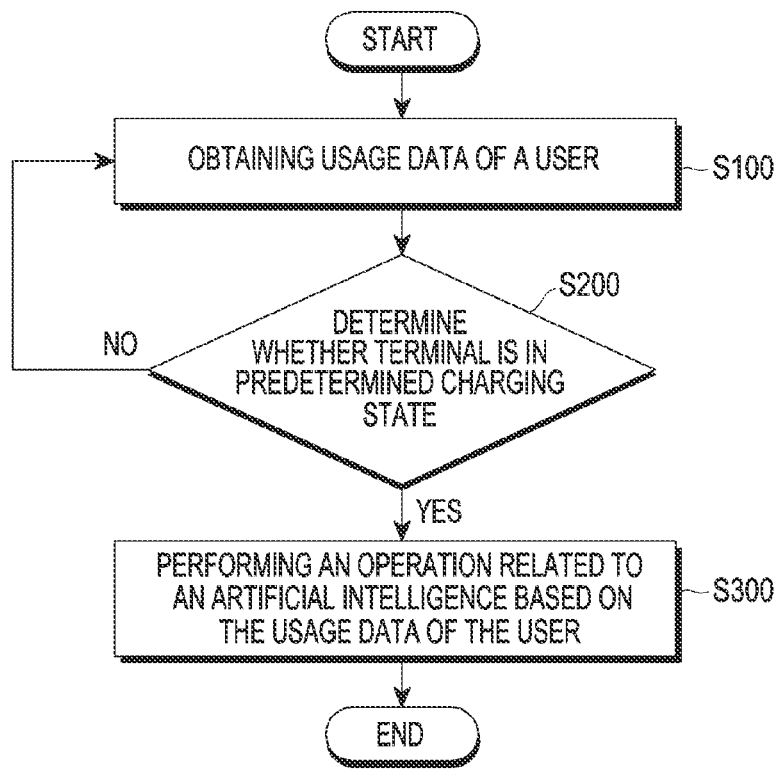
FIG. 1 shows a flowchart of a method of managing a terminal according to an exemplary embodiment of the present disclosure.

Reference will now be made in detail to exemplary embodiments of the present disclosure, examples of which are shown in the accompanying drawings, where the same reference numerals always refer to the same components.

The embodiments will be described below with reference to the accompanying drawings, to explain the present disclosure.

FIG. 1 shows a flowchart of a method of managing a terminal according to an exemplary embodiment of the present disclosure. Here, as an example, the terminal may be a smart phone, a tablet computer, a personal computer, a multimedia player, and other electronic devices having artificial intelligence computing functions.

As shown in FIG. 1, the method comprises, in step S100, obtaining usage data of an user. Here, the obtained usage data of the user may be the usage data of the user on the terminal, such as, but not limited to, screen on/off data, power on/off data, player usage data, browser usage data, etc. of the terminal during the user using the terminal.

Additionally, the method may further include a step of determining whether the terminal is in a predetermined charging state. Specifically, the method comprises, in step S200, determining whether the terminal is in a predetermined charging state.

For example, the predetermined charging state indicates at least one of a charging stage where a current battery power is greater than a preset threshold, a charging state where a predetermined power supply mode is provided, a charging stage where real-time charging power is greater than a real-time power consumption, charging within a predetermined time period, and a charging state in which it is predicted based on a predetermined algorithm that a predetermined charging condition is satisfied.

For example, assuming that the preset threshold is 40% of the full capacity of the battery of the terminal, the charging stage where the current power is greater than the preset threshold may refer to a charging stage when the current power is greater than 40% of the full capacity of the battery. In addition, when the preset threshold is 100% of the full capacity of the battery, the charging stage where the current power is greater than the preset threshold may include an overcharged stage, that is, a charging stage where charging power is greater than the full capacity of the battery. For example, the power source is still connected after the terminal is fully charged. It should be understood that the preset threshold is not limited to 40% or 100% of the full capacity of the battery in the above examples, but may be any value according to an actual setting, and the present disclosure is not limited thereto.

Since various wired power supply modes in which a power source is connected may provide more stable power supply, but a USB charging mode, a mobile power charging mode, wireless charging modes and the like cannot provide stable power supply, therefore, in an exemplary embodiment of the present disclosure, the predetermined power supply mode may include a wired power supply mode in which an original charger is connected to the power source and a wired power supply mode in which a universal non-original charger is used to access the power source. Here, a power management device in the terminal may distinguish between a charger charging mode and a USB charging mode by detecting the differences in charging voltages and charging currents therein. In addition, the power management device may also distinguish between a wired charging mode and a wireless charging mode with the differences in charging inputs therein. Those skilled in the art should understand that the above predetermined power supply mode is only exemplary, and it may also be others determined by those skilled in the art according to technical development and actual scenarios, and the present disclosure is not limited thereto.

In addition, as an example, the charging within the predetermined time period may include charging in a predetermined mode within the predetermined time period. For example, various predetermined modes are preset in the terminal, for example, a power saving mode, an on duty mode, an exercise mode, and the like. If the predetermined time period is a time period at night, for example, 10 pm to 2 am on the next day, the predetermined mode is a night power saving mode, then the charging within the predetermined time period may be charging in the night power saving mode.

In addition, as an example, in the charging state where the predetermined charging condition is satisfied, the operation related to the artificial intelligence may be performed without affecting the user's charging demand during charging. In an example, the charging state in which the predetermined charging condition is satisfied is predicted according to the predetermined algorithm by the following steps.

Firstly, the steps comprise obtaining historical charging data of the terminal. As an example, the historical charging data includes at least one of a time period for performing the charging, a charging duration, a power supply mode, information on power consumption of the terminal and a power consumption mode of the terminal during the charging.

Then, the steps further comprise predicting a current charging trend according to the predetermined algorithm, based on the historical charging data of the terminal. An existing predetermined algorithm may be used to predict the current charging trend based on the historical charging data of the terminal. The predetermined algorithm here may include, but is not limited to, an artificial intelligence model for predicting the current charging trend, and a mathematical formula for predicting the current charging trend.

Then, the steps further comprise determining whether the trend satisfies the predetermined charging condition. In an example, it may be determined whether the battery power is reduced with the implementation of the operation related to the artificial intelligence related operation during the charging. If the battery power is not reduced with the implementation of the operation related to the artificial intelligence related operation during the charging, it may be determined that the trend satisfies the predetermined charging condition. The charging in a state where the trend satisfies the predetermined charging condition may be determined as the charging state in which the predetermined charging condition is satisfied.

In addition, in the step of determining whether the terminal is in the predetermined charging state, in an example, it may be determined whether a result obtained after power consumption of the terminal and to-be-charged power of the terminal are subtracted from chargeable power of the terminal within a predetermined time period in the future is greater than power consumption required to perform the operation related to the artificial intelligence. If the result is greater than the power consumption required to perform the operation related to the artificial intelligence, the terminal is in the predetermined charging state. If the result is less than or equal to the power consumption required to perform the operation related to the artificial intelligence, the terminal is not in the predetermined charging state.

Here, the chargeable power of the terminal is the power charged to the terminal within the predetermined time period. The to-be-charged power of the terminal is a difference between target power and current power of the terminal when the terminal is being charged. The power consumption of the terminal is power consumption required when the terminal does not perform the operation related to the artificial intelligence within the predetermined time period.

As an example, the power consumption required to perform the operation related to the artificial intelligence is power required to perform the artificial intelligence related operation with the minimum amount of computation. The target power is battery power to which the user is used to charging the terminal in a current period.

Specifically, the power charged to the terminal within the predetermined time period, the target power when the terminal is charged, the current power of the terminal, and the power consumption required when the terminal does not perform the operation related to the artificial intelligence may be determined as above. The following specific examples may illustrate how to determine the difference between the chargeable power of the terminal and the to-be-charged power of the terminal and the power consumption of the terminal within the predetermined time period.

For example, in the case that a historical charging rule of the terminal includes a time period for performing the charging, a charging duration, a power supply mode, information on power consumption of the terminal and a power consumption mode of the terminal during the charging, the following may be available: the charging start time point t, the charging end time point P, the current power E of the terminal, the target power E1 when the terminal is charged, the time B required for the terminal to consume unit power without performing the operation related to the artificial intelligence, and the time A required for charging the unit power into the terminal. Then, the difference E0 between the chargeable power of the terminal and the to-be-charged power of the terminal and the power consumption of the terminal within the predetermined time period may be calculated by Equation (1):

$$E0=(P-t)/A-(E1-E)-(P-t)/B \qquad (1)$$

If the power required to perform an operation related to the artificial intelligence with the minimum amount of computation is E2, E0 and E2 may be determined and compared. If E0 is greater than E2, it is determined that the battery power of the terminal satisfies the requirements for performing the operation related to the artificial intelligence.

On the other hand, if the terminal is not in the predetermined charging state, it returns to step S100. If the terminal is in the predetermined charging state, in step S300, the operation related to the artificial intelligence is performed using the usage data of the user.

Further, additionally, the method may also include a step of controlling a parameter which is used by the terminal to perform the operation related to the artificial intelligence, based on the charging parameter.

Specifically, the charging parameter of the terminal may be obtained firstly. Then, a parameter may be controlled which is used by the terminal to perform the operation related to the artificial intelligence based on the charging parameter.

In an example, the artificial intelligence related operation may include training a machine learning model. Specifically, a parameter which is used by the terminal to perform the artificial intelligence related operation may be controlled based on the charging parameter by controlling, based on the charging parameter of the terminal, a learning rate of the training which is used by the terminal to train the machine learning model. The learning rate of the training indicates a step size for moving between a target function of the machine learning model and the minimum value of the target function.

Specifically, the obtained charging parameter of the terminal may include at least one of a charging current value, a consumed current value, current power, an estimated value of power, a charging duration, and an adjustment coefficient of the charging duration.

As an example, the learning rate of the training $\alpha$ used in training the machine learning model may be determined by Equation (2):

$$\alpha = \begin{cases} \left(\dfrac{1}{C_m - C_n}\right)e^{-\lambda t}, & C_m > C_n \\ \left(\dfrac{1}{C_k}\right)e^{-\lambda t}, & C_m \leq C_n \text{ and } E > E_k \\ 0, & C_m < C_n \text{ and } E \leq E_k \end{cases} \qquad (2)$$

Here, $C_m$ is the charging current value of the terminal, $C_n$ is the consumed current value of the terminal, $C_k$ is a constant predetermined current value, E is the current power of the terminal, $E_k$ is the estimated value of the power of the terminal, t is the charging duration, $\lambda$ is the adjustment coefficient of the charging duration, and e is the base of the natural logarithm, where $C_k < C_n$.

Specifically, when the charging current value $C_m$ of the terminal is less than the consumed current value $C_n$ of the terminal and the current power E of the terminal is greater than the estimated value of the power $E_k$ of the terminal, the constant predetermined current value $C_k$ is an infinitesimal constant value, $C_k < C_n$. It can be known, from the above equation, that in this case, the learning rate of the training $\alpha$ is large enough to make the step size for moving between the target function of the machine learning model and the minimum value become large enough, so that the convergence of this computing is quickly stopped to temporarily end this training process. In this way, when the power is insufficient, the computing process of the machine learning model may be temporarily ended to reduce the power consumption of the terminal and prevent the interruption of the computing of the machine learning model due to power down.

In addition, when the charging current value $C_m$ of the terminal is less than the consumed current value $C_n$ of the terminal and the current power E of the terminal is less than or equal to the estimated value of the power $E_k$ of the terminal, the learning rate of the training $\alpha$ is zero, indicating that the equation is invalid. In this regard, the current computing of the machine learning model is stopped. This way may also prevent the interruption of the computing of the machine learning model due to power down.

In addition, when the charging current value $C_m$ of the terminal is larger than the consumed current value $C_n$ of the terminal, the learning rate of the training $\alpha$ obtained according to the above equation becomes smaller compared to the case where there is only the consumed current value $C_n$ without the charging, such that the step size for moving between the target function of the machine learning model and the minimum value becomes smaller.

Therefore, the amount of input data and the number of data calculation iterations may increase accordingly, the duration for training the machine learning model may decrease, and the training efficiency and accuracy of the machine learning model may be improved.

In addition, when the charging current value $C_m$ of the terminal is larger than the consumed current value $C_n$ of the terminal, the total battery power of the terminal may increase accordingly as the charging duration increases. In this regard, when a power growth value of the terminal exceeds a preset growth threshold, the learning rate of the training α may be moderately attenuated. For example, the learning rate of the training α may be reduced to a preset predetermined value of the learning rate, so that the step size for moving between the target function of the machine learning model and the minimum value is correspondingly reduced. In this way, the training accuracy of the machine learning model may be improved in the case that the terminal has sufficient power. In this way, the rhythm and duration for training the machine learning model may be adaptively adjusted to achieve a technical effect of ensuring the stability of training the machine learning model and reducing the power consumption of the terminal.

On the other hand, if the charging is terminated during the process of training the machine learning model, the training may be stopped after the current iteration calculation. The calculation result may be temporarily stored, and then used for the next training of the machine learning model.

Furthermore, in another example, the operation related to the artificial intelligence may include the application of a machine learning model. For example, assuming that a predetermined machine training model is a user usage scenario model, the usage data of the user (e.g., the usage habits data of the user) may be input into the user usage scenario model, which then may output a classification result determined by the currently obtained usage data of the user. The power consumption allocation of the terminal may be changed based on the classification result. For example, unnecessary hardware-related modules and applications may be shut down according to a discriminated scenario, such that the terminal may enter an power saving mode. For example, if the classification result indicates a scenario in which the user is planning to go out, the user may be reminded of charging in advance based on the current battery power of the terminal and a predicted departure time.

The method for managing the terminal according to the exemplary embodiments of the present disclosure can adaptively select the timing for performing an operation related to the artificial intelligence to achieve a technical effect of improving the stability of the intelligent operation and reducing the power consumption of the terminal.

Figure 2:
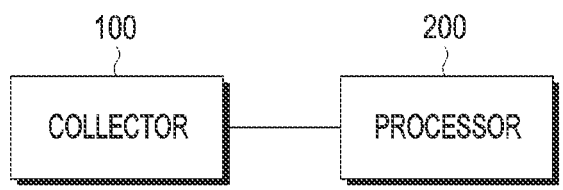
FIG. 2 shows a block diagram of a terminal according to an exemplary embodiment of the present disclosure.

FIG. 2 shows a block diagram of a terminal according to an exemplary embodiment of the present disclosure. As an example, the terminal may be a smart phone, a tablet computer, a personal computer, and other electronic devices having artificial intelligence computing functions of large-scale data volume. As shown in FIG. 2, the terminal according to an exemplary embodiment of the present disclosure includes a collector 100 and a processor 200.

Specifically, the processor 200 is configured to perform the following processing.

Firstly, the processor 200 is configured to control the collector 100 to obtain usage data of a user. Here, the obtained usage data of the user may be the usage data of the user on the terminal, such as, but not limited to, screen on/off data, power on/off data, player usage data, browser usage data, etc. of the terminal during the user using the terminal.

The processor 200 may further additionally determine whether the terminal is in a predetermined charging state.

For example, the predetermined charging state indicates at least one of a charging stage where current battery power is greater than a preset threshold, a charging state where a predetermined power supply mode is provided, a charging stage where real-time charging power is greater than real-time power consumption charging within a predetermined time period, and a charging state in which it is predicted based on a predetermined algorithm that a predetermined charging condition is satisfied.

As an example, in the charging state where the predetermined charging condition is satisfied, the operation related to the artificial intelligence can be performed without affecting the user's charging demand during charging. In one example, the processor 200 may be configured to predict the charging state in which the predetermined charging condition is satisfied according to the predetermined algorithm as below:

Firstly, the processor 200 obtains historical charging data of the terminal. As an example, the historical charging data includes at least one of a time period for performing the charging, a charging duration, a power supply mode, information on power consumption of the terminal and a power consumption mode of the terminal during the charging.

Then, the processor 200 determines a current charging trend according to the predetermined algorithm based on the historical charging data of the terminal. An existing predetermined algorithm may be used to predict the current charging trend based on the historical charging data of the terminal. The predetermined algorithm here may include, but is not limited to, an artificial intelligence model for predicting the current charging trend, and a mathematical formula for predicting the current charging trend.

Then, the processor 200 may determine whether the trend satisfies the predetermined charging condition. In an example, the processor 200 may determine whether the battery power is reduced with the implementation of the operation related to the artificial intelligence during the charging. If the battery power is not reduced with the implementation of the operation related to the artificial intelligence during the charging, the processor may determine the trend satisfies the predetermined charging condition. The processor may determine the charging in a state where the trend satisfies the predetermined charging condition as the charging state in which the predetermined charging condition is satisfied.

In addition, in one example, the processor 200 may be configured to determine whether the terminal is in a predetermined charging state. The processor 200 may determine whether a result obtained after power consumption of the terminal and to-be-charged power of the terminal are subtracted from chargeable power of the terminal within a predetermined time period in the future is greater than power consumption required to perform the operation related to the artificial intelligence. If the result is greater than the power consumption required to perform the operation related to the artificial intelligence, the terminal is in the predetermined charging state. If the result is less than or equal to the power consumption required to perform the operation related to the artificial intelligence, the terminal is not in the predetermined charging state.

Here, the chargeable power of the terminal is the power charged to the terminal within the predetermined time period. The to-be-charged power of the terminal is a difference between target power and current power of the terminal when the terminal is being charged. The power consumption of the terminal is power consumption required when the terminal does not perform the operation related to the artificial intelligence within the predetermined time period.

As an example, the power consumption required to perform the operation related to the artificial intelligence is power required to perform the operation related to the artificial intelligence with the minimum amount of computation. The target power is battery power to which the user is used to charging the terminal in a current period.

On the other hand, the processor 200 may perform the operation related to the artificial intelligence using the usage data of the user, in response to the terminal being in the predetermined charging state.

In addition, the processor 200 is further configured to obtain a charging parameter of the terminal; and control a parameter which is used by the terminal to perform the operation related to the artificial intelligence, based on the charging parameter.

In an example, the operation related to the artificial intelligence includes training α machine learning model. Specifically, the processor 200 may be configured to control a parameter which is used by the terminal to perform the operation related to the artificial intelligence, based on the charging parameter as below. The processor 200 may control, based on the charging parameter of the terminal, a learning rate of the training which is used by the terminal to train the machine learning model, wherein the learning rate of the training indicates a step size for moving between a target function of the machine learning model and a minimum value of the target function. Specifically, the obtained charging parameter of the terminal may include at least one of a charging current value, a consumed current value, current battery power, an estimated value of power, a charging duration, and an adjustment coefficient of the charging duration.

According to an exemplary embodiment of the present disclosure, the processor 200 may include one or more processors. In this regard, the one or more processors may be general-purpose processors, such as central processing units (CPU), application processors (AP) and the like, processors only for graphic processing (such as graphics processors (GPU), visual processors (VPU) and/or AI-specific processors (e.g., neural processing units (NPU)).

The one or more processors control the processing of input data according to predefined operating rules or artificial intelligence (AI) models stored in non-volatile memories and volatile memories. The predefined operating rules or artificial intelligence models may be provided by training or learning. Here, the meaning of "be provided by learning" is that the predefined operation rules or AI model having desired characteristics may be formed by applying a learning algorithm to much learning data. The learning may be performed in the device for performing the AI according to an embodiment, and/or may be implemented by a separate server/device/system.

As an example, an artificial intelligence model may comprise a plurality of neural network layers. Each layer has a plurality of weight values. Layer operation is performed through the calculation of a previous layer and the operation of the plurality of weight values. Examples of neural networks include but are not limited to convolutional neural networks (CNN), deep neural networks (DNN), recurrent neural networks (RNN), restricted Boltzmann machines (RBM), deep belief networks (DBN), bidirectional recursion deep neural networks (BRDNN), generative adversarial networks (GAN) and deep Q networks.

A learning algorithm is a method that various learning data are used to train a predetermined target device (e.g., a robot) to make, allow, or control the target device to make a determination or prediction. Examples of the learning algorithms includes but are not limited to supervised learning, unsupervised learning, semi-supervised learning or reinforcement learning.

The computer readable storage medium according to an exemplary embodiment of the present disclosure stores a computer program, when executed by the processor, that causes the processor to execute the method of managing the terminal in the above exemplary embodiments. The computer readable storage medium is any data storage apparatus that can store data read by a computer system. Examples of the computer readable storage medium include read-only memories, random access memories, read-only optical disks, magnetic tapes, floppy disks, optical data storage apparatuses, and carrier waves (such as data transmission through the Internet via wired or wireless transmission paths).

In summary, in the terminal and the method for managing the terminal according to the exemplary embodiments of the present disclosure, the timing for performing an artificial intelligence related operation can be adaptively selected, to achieve a technical effect of improving the stability of the intelligent operation and reducing the power consumption of the terminal.

Although the present disclosure has been specifically shown and described with reference to its exemplary embodiments, those skilled in the art should understand that various changes in form and details may be made without departing from the spirit and scope of the present disclosure as defined by the claims.

What is claimed is:

1. A method for managing a terminal, the method comprising:
    obtaining usage data of a user;
    determining whether a first value obtained by subtracting power consumption of the terminal and to-be-charged power of the terminal from chargeable power of the terminal within a predetermined time period is greater than a second value which is a power consumption required to perform an operation related to an artificial intelligence,
    determining that the terminal is in a predetermined charging state, if the first value is greater than the second value; and
    performing the operation related to an artificial intelligence based on the usage data of the user, in response to determining that the terminal is in the predetermined charging state,
    wherein the chargeable power of the terminal is power to be charged to the terminal within the predetermined time period, the to-be-charged power of the terminal is a difference between target power and current power of the terminal when the terminal is charged, the power consumption of the terminal is power consumption required when the terminal does not perform the operation related to the artificial intelligence within the predetermined time period.

2. The method of claim 1, wherein the predetermined charging state indicates at least one of:
    a charging state where current battery power of the terminal is greater than a preset threshold, a charging state where a predetermined power supply mode is provided, a charging state where real-time charging power is greater than real-time power consumption charging within a predetermined time period, and a charging state in which it is predicted based on a predetermined algorithm that a predetermined charging condition is satisfied; and wherein the method further comprises:
obtaining a charging parameter of the terminal; and
controlling at least one parameter which is used by the terminal to perform the operation related to the artificial intelligence based on the charging parameter of the terminal.

3. The method of claim 2, wherein the charging state in which it is predicted that the predetermined charging condition is satisfied according to the predetermined algorithm is determined by:
obtaining historical charging data of the terminal;
determining a current charging trend according to the predetermined algorithm based on the historical charging data of the terminal;
determining whether the current charging trend satisfies the predetermined charging condition; and
determining that the current charging trend satisfies the predetermined charging condition as the charging state if the predetermined charging condition is satisfied,
wherein in the charging state which the predetermined charging condition is satisfied, the operation related to the artificial intelligence can be performed without affecting the user's charging demand during charging of the terminal.

4. The method of claim 3, wherein determining whether the current charging trend satisfies the predetermined charging condition comprises:
determining whether battery power of the terminal is reduced when the operation related to the artificial intelligence is performed during the charging of the terminal; and
determining the current charging trend satisfies the predetermined charging condition, if the battery power of the terminal is not reduced,
wherein the historical charging data comprises at least one of a time period for performing the charging, a charging duration, a power supply mode, information on power consumption of the terminal and a power consumption mode of the terminal during the charging of the terminal.

5. The method of claim 2,
wherein the operation related to the artificial intelligence comprises:
training a machine learning model, and
wherein controlling the at least one parameter comprises:
controlling, based on the charging parameter of the terminal, a learning rate of the training which is used by the terminal to train the machine learning model, wherein the learning rate of the training indicates a step size for moving between a target function of the machine learning model and a minimum value of the target function; and
wherein charging within the predetermined time period comprises charging in a predetermined mode within the predetermined time period.

6. The method of claim 4, wherein the power consumption required to perform the operation related to the artificial intelligence is power required to perform the operation related to the artificial intelligence with minimum amount of computation.

7. The method of claim 5, wherein the target power is battery power to which the user is used to charging the terminal in a current period.

8. A terminal, comprising:
a collector; and
a processor coupled to the collector, wherein the processor is configured to:
obtain usage data of a user;
determine whether a first value obtained by subtracting power consumption of the terminal and to-be-charged power of the terminal from chargeable power of the terminal within a predetermined time period is greater than a second value which is a power consumption required to perform an operation related to an artificial intelligence;
determine that the terminal is in a predetermined charging state, if the first value is greater than the second value; and
perform the operation related to an artificial intelligence based on the usage data of the user, in response to determining that the terminal is in the predetermined charging state,
wherein the chargeable power of the terminal is power to be charged to the terminal within the predetermined time period, the to-be-charged power of the terminal is a difference between target power and current power of the terminal when the terminal is charged, the power consumption of the terminal is power consumption required when the terminal does not perform the operation related to the artificial intelligence within the predetermined time period.

9. The terminal of claim 8, wherein the predetermined charging state indicates at least one of:
a charging state where current battery power of the terminal is greater than a preset threshold, a charging state where a predetermined power supply mode is provided, a charging state where real-time charging power is greater than real-time power consumption charging within a predetermined time period, and a charging state in which it is predicted based on a predetermined algorithm, that a predetermined charging condition is satisfied; and
wherein the processor is further configured to:
obtain a charging parameter of the terminal; and
control at least one parameter which is used by the terminal to perform the operation related to the artificial intelligence, based on the charging parameter of the terminal.

10. The terminal of claim 9, wherein the processor is further configured to:
obtain historical charging data of the terminal;
determine a current charging trend according to the predetermined algorithm, based on the historical charging data of the terminal;
determine whether the current charging trend satisfies the predetermined charging condition; and
determine that the current charging trend satisfies the predetermined charging condition as the charging state if the predetermined charging condition is satisfied,
wherein in the charging state which the predetermined charging condition is satisfied, the operation related to the artificial intelligence can be performed without affecting the user's charging demand during charging of the terminal.

11. The terminal of claim 10, wherein the processor is further configured to:
determine whether battery power of the terminal is reduced when the operation related to the artificial intelligence is performed during the charging of the terminal; and
determine the current charging trend satisfies the predetermined charging condition, if the battery power of the terminal is not reduced,
and/or, wherein the historical charging data comprises at least one of a time period for performing the charging, a charging duration, a power supply mode, information on power consumption of the terminal and a power consumption mode of the terminal during the charging of the terminal.

12. The terminal of claim 9,
wherein the processor is further configured to:
train a machine learning model, and
wherein controlling the at least one parameter comprises:
control, based on the charging parameter of the terminal, a learning rate of the training which is used by the terminal to train the machine learning model, wherein the learning rate of the training indicates a step size for moving between a target function of the machine learning model and a minimum value of the target function; and
wherein charging within the predetermined time period comprises charging in a predetermined mode within the predetermined time period.

13. The terminal of claim 12, wherein the power consumption required to perform the operation related to the artificial intelligence is power required to perform the operation related to the artificial intelligence with minimum amount of computation.

14. The terminal of claim 13, wherein the target power is battery power to which the user is used to charging the terminal in a current period.

15. A computer readable storage medium storing a computer program for managing a terminal thereon, wherein the computer program, when executed by a processor of the terminal, cause the terminal to:
obtain usage data of a user;
determine whether a first value obtained by subtracting power consumption of the terminal and to-be-charged power of the terminal from chargeable power of the terminal within a predetermined time period is greater than a second value which is a power consumption required to perform an operation related to an artificial intelligence;
determine that the terminal is in a predetermined charging state, if the first value is greater than the second value; and
perform the operation related to an artificial intelligence based on the usage data of the user, in response to determining that the terminal is in the predetermined charging state,
wherein the chargeable power of the terminal is power to be charged to the terminal within the predetermined time period, the to-be-charged power of the terminal is a difference between target power and current power of the terminal when the terminal is charged, the power consumption of the terminal is power consumption required when the terminal does not perform the operation related to the artificial intelligence within the predetermined time period.

16. The computer readable storage medium of claim 15, wherein the predetermined charging state indicates at least one of:
a charging state where current battery power of the terminal is greater than a preset threshold, a charging state where a predetermined power supply mode is provided, a charging state where real-time charging power is greater than real-time power consumption charging within a predetermined time period, and a charging state in which it is predicted based on a predetermined algorithm that a predetermined charging condition is satisfied; and
wherein the computer program, when executed by the processor of the terminal, cause the terminal to:
obtain a charging parameter of the terminal; and
control at least one parameter which is used by the terminal to perform the operation related to the artificial intelligence based on the charging parameter of the terminal.

17. The computer readable storage medium of claim 16, wherein the charging state in which it is predicted that the predetermined charging condition is satisfied according to the predetermined algorithm is determined by:
obtaining historical charging data of the terminal;
determining a current charging trend according to the predetermined algorithm based on the historical charging data of the terminal;
determining whether the current charging trend satisfies the predetermined charging condition; and
determining that the current charging trend satisfies the predetermined charging condition as the charging state if the predetermined charging condition is satisfied,
wherein in the charging state which the predetermined charging condition is satisfied, the operation related to the artificial intelligence can be performed without affecting the user's charging demand during charging of the terminal.

18. The computer readable storage medium of claim 17, wherein determining whether the current charging trend satisfies the predetermined charging condition comprises:
determining whether battery power of the terminal is reduced when the operation related to the artificial intelligence is performed during the charging of the terminal; and
determining the current charging trend satisfies the predetermined charging condition, if the battery power of the terminal is not reduced,
wherein the historical charging data comprises at least one of a time period for performing the charging, a charging duration, a power supply mode, information on power consumption of the terminal and a power consumption mode of the terminal during the charging of the terminal.

19. The computer readable storage medium of claim 16, wherein the operation related to the artificial intelligence comprises:
training a machine learning model, and
wherein to control the at least one parameter, the computer program, when executed by the processor of the terminal, cause the terminal to:
control, based on the charging parameter of the terminal, a learning rate of the training which is used by the terminal to train the machine learning model, wherein the learning rate of the training indicates a step size for moving between a target function of the machine learning model and a minimum value of the target function, and
wherein charging within the predetermined time period comprises charging in a predetermined mode within the predetermined time period, and
wherein the target power is battery power to which the user is used to charging the terminal in a current period.

20. The computer readable storage medium of claim 18, wherein the power consumption required to perform the operation related to the artificial intelligence is power required to perform the operation related to the artificial intelligence with minimum amount of computation.

\* \* \* \* \*